United States Patent [19]
Tilley

[11] Patent Number: 5,545,104
[45] Date of Patent: Aug. 13, 1996

[54] AUTOMOTIVE SUN GEAR/PLANETARY HOUSING ASSEMBLY

[76] Inventor: Michael J. Tilley, 14213 N. 37th Way, Phoenix, Ariz. 85032

[21] Appl. No.: 384,512

[22] Filed: Feb. 6, 1995

[51] Int. Cl.⁶ ................................... F16H 57/08
[52] U.S. Cl. .................... 475/331; 475/159; 475/346; 74/467
[58] Field of Search ................ 74/467, 606 R; 475/159, 331, 346

[56] References Cited

U.S. PATENT DOCUMENTS

| | | | |
|---|---|---|---|
| 3,906,818 | 9/1975 | Benthake et al. | 475/331 X |
| 4,008,629 | 2/1977 | Hoepfl et al. | 475/331 |
| 4,480,492 | 11/1984 | Fujioka et al. | 475/159 X |
| 4,759,234 | 7/1988 | Premiski et al. | 475/159 |
| 5,188,576 | 2/1993 | Maguire et al. | 475/159 X |
| 5,292,291 | 3/1994 | Ostertag | 475/252 |
| 5,368,528 | 11/1994 | Farrell | 475/159 X |

*Primary Examiner*—Charles A. Marmor
*Assistant Examiner*—Peter Kwon
*Attorney, Agent, or Firm*—Jordan M. Meschkow; Lowell W. Gresham; Mark Takahashi

[57] ABSTRACT

A sun gear/planetary housing apparatus for use in a vehicle transfer case assembly is provided. The apparatus includes a planetary housing assembly having a body, a gear cavity formed within the body, a gear supporting ridge located within the gear cavity, a plurality of notches located on the gear supporting ridge, and a washer accepting groove located on the gear supporting ridge; a washer having a plurality of oil carrying channels and a plurality of tabs configured to engage with the notches; and a sun gear assembly having a gear end and a bearing surface located on the gear end. A method of assembling a sun gear/planetary housing apparatus is also provided.

16 Claims, 2 Drawing Sheets

AUTOMOTIVE SUN GEAR/PLANETARY HOUSING ASSEMBLY

BACKGROUND OF THE INVENTION

1. Field of the Invention

The present invention relates generally to automotive components. In particular, the present invention relates to components for use in automotive transfer case assemblies.

2. Prior Art

It is well known that repairs to automobile transmissions and engines can be intricate and costly. For example, a four wheel drive vehicle drivetrain typically includes a transfer case assembly, which delivers driving power to the two wheels that are undriven in their two wheel drive counterparts. A transfer case contains several rotating or moving parts that tend to wear down or break after some time. Specifically, some vehicle transfer cases include a planetary housing and a sun gear that rotates within the planetary housing. The constant rotation of the sun gear within the planetary housing may cause unwanted frictional wear of transfer case components.

Premature wear of the planetary housing or sun gear is a common problem associated with many transfer case assemblies. Such wearing occurs in older transfer cases, where the sun gear to planetary housing junction is metal against metal, and in newer transfer cases, where washers are often placed between the sun gear and planetary housing.

The washers themselves sometimes cause undue wear because they rotate within the transfer case along with the sun gear. This condition can arise early in the lifespan of an automobile, sometimes after only 40,000 miles have been driven.

Usually, this type of problem requires the replacement of the entire planetary housing and sun gear assemblies. Such repairs are rather costly, but are often necessary because the sun gear and planetary housing may be otherwise non-serviceable.

Therefore, it is desirable to have a transfer case assembly that is relatively free from wear caused by the sun gear rotating against the planetary housing. It is also desirable to have a method of repairing a transfer case that has suffered the type of premature wearing described above.

SUMMARY OF THE INVENTION

Accordingly, it is an advantage of the present invention that a vehicle sun gear/planetary housing assembly is provided that does not experience premature wearing due to the rotation of the sun gear.

A further advantage of the present invention is that a vehicle sun gear/planetary housing assembly is provided that does not require replacement when premature wearing due to the rotation of the sun gear occurs.

Another advantage of the present invention is that a method of repairing vehicle sun gear/planetary housing assemblies is provided.

The above and other advantages of the present invention are carried out in one form by an apparatus that includes a planetary housing assembly, a sun gear assembly, a washer located between the planetary housing and the sun gear, and a means for securing the washer such that the washer remains substantially stationary when the sun gear assembly rotates within the planetary housing.

BRIEF DESCRIPTION OF THE DRAWINGS

A more complete understanding of the present invention may be derived by referring to the detailed description and claims when considered in connection with the Figures, wherein like reference numbers refer to similar items throughout the Figures, and:

DETAILED DESCRIPTION OF THE PREFERRED EMBODIMENT

Figure 1:
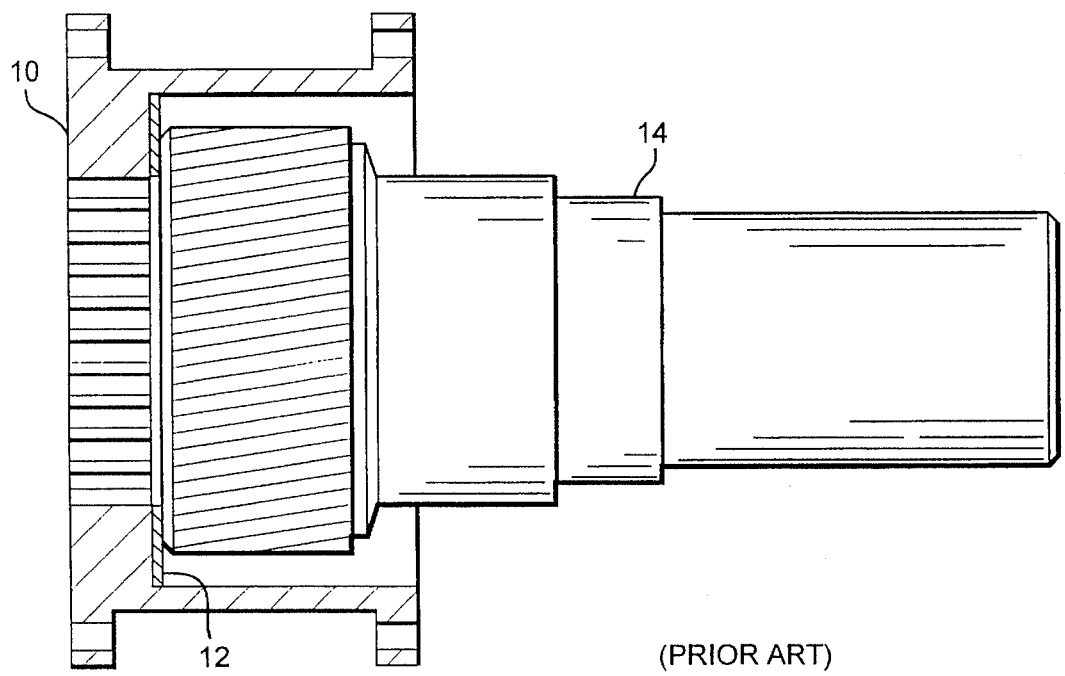
FIG. 1 shows a sectional view of a prior art vehicle sun gear/planetary housing assembly.

Referring to FIG. 1, a prior art assembly is illustrated as it would be configured when installed in a vehicle transfer case. Typically, a prior art assembly includes a planetary housing 10, a washer 12, and a sun gear 14.

Figure 2:
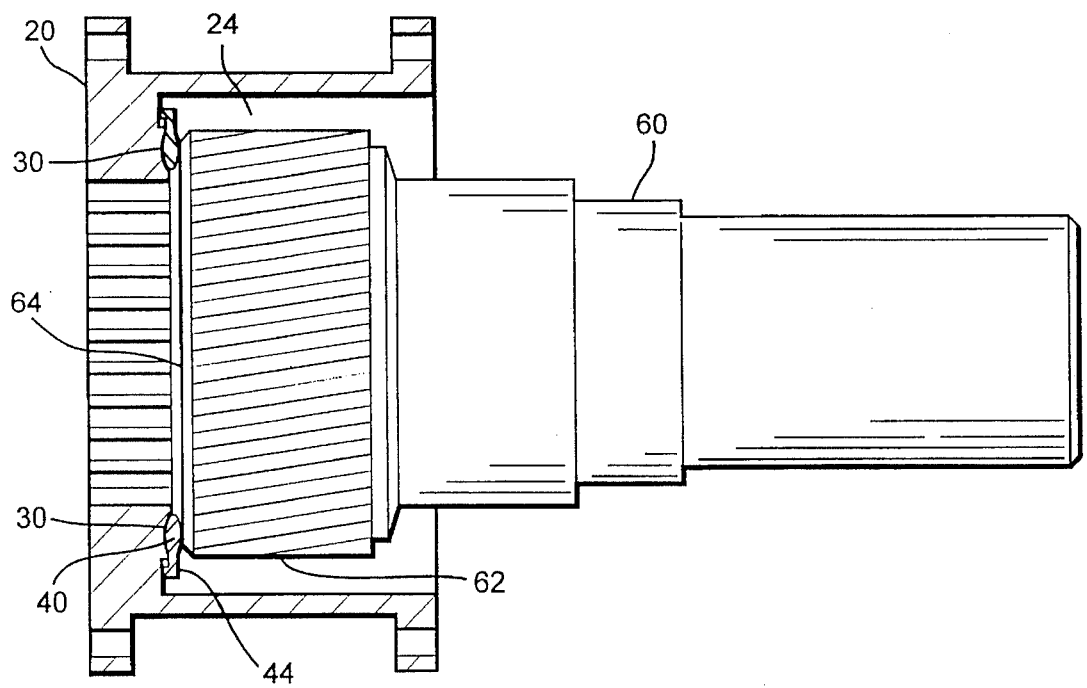
FIG. 2 shows a sectional view of an apparatus according to the preferred embodiment of the present invention.

In comparison, FIG. 2 depicts a sun gear/planetary apparatus according to the preferred embodiment of the present invention, in the same relative configuration. With continued reference to FIG. 2, the apparatus generally includes a planetary housing assembly 20, a ring-shaped washer 40, and a sun gear assembly 60. Planetary housing 20 is illustrated in a sectional view to show the placement of washer 40.

Figure 4:
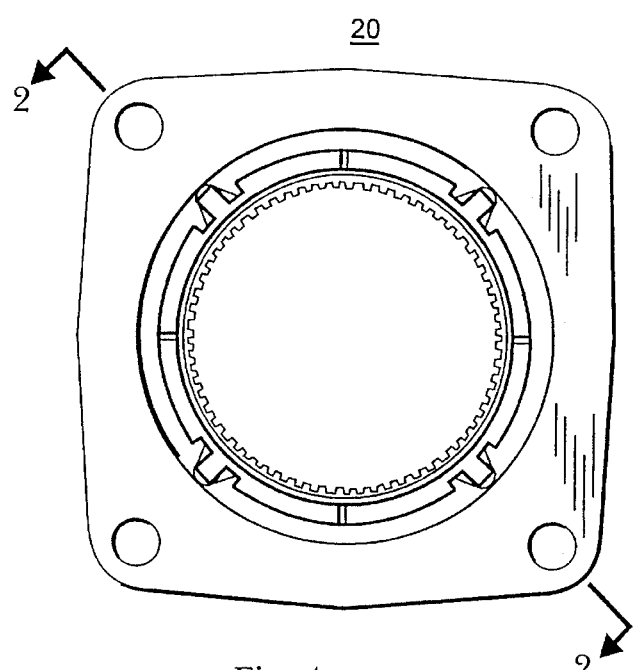
FIG. 4 shows a plan view of a planetary housing and a washer according to the preferred embodiment of the present invention.

FIG. 4 depicts the sectional lines 2—2 along which planetary housing 20 is viewed from in FIG. 2. Although the prior art assembly depicted in FIG. 1 includes washer 12, some prior art assemblies do not include a washer (or other element) between planetary housing 10 and sun gear 14 allowing metal to metal contact and wear.

Figure 3:
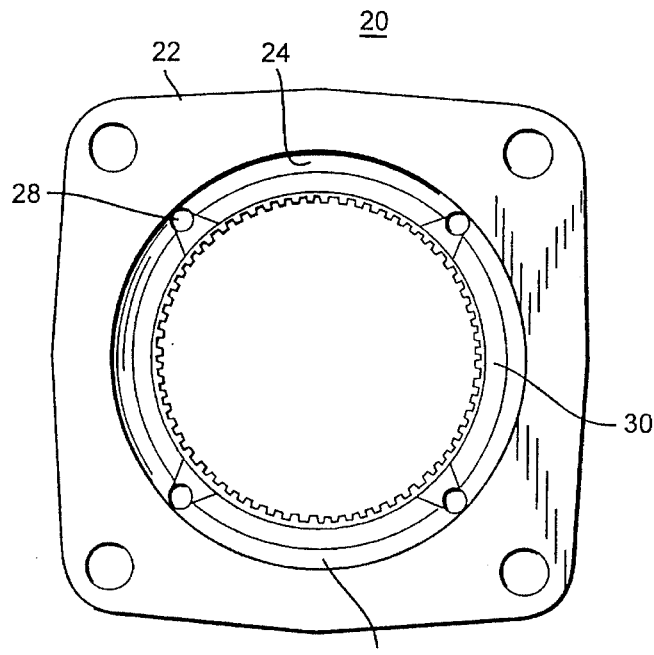
FIG. 3 shows a plan view of a planetary housing according to the preferred embodiment of the present invention.

Referring now to FIG. 3, and with continued reference to FIG. 2, planetary housing 20 is illustrated in more detail. Planetary housing 20 includes a body 22, a gear cavity 24 formed within the body, a gear supporting ridge 26 located within the gear cavity, a plurality of notches 28 located on the gear supporting ridge, and a washer accepting groove 30 located on the gear supporting ridge. Planetary housing 20 is preferably formed from metal suitable for use in automotive applications, such as aluminum, steel, or iron.

Body 22 is substantially hollow, forming gear cavity 24. Gear cavity 24 is substantially cylindrical in shape. When assembled, the apparatus also includes sun gear 60, which is disposed within gear cavity 24. Gear cavity 24 terminates within body 22 by forming gear supporting ridge 26. In older prior art apparatus (not shown), the sun gear rotates directly against the gear supporting ridge. The metal to metal friction eventually causes the sun gear, the planetary housing, or both to wear down. In comparison, according to the preferred embodiment of the present invention, sun gear 60 rotates against washer 40, which is positioned against gear supporting ridge 26.

According to the present invention, gear supporting ridge 26 is configured to accept and secure washer 40 when assembled in the transfer case. In particular, gear supporting ridge 26 contains notches 28 and washer accepting groove 30. Washer accepting groove 30 is machined into gear supporting ridge 26 such that it matches the profile of washer 40. As shown in FIG. 2, the preferred embodiment of the present apparatus includes washer 40 that has an oval cross section. As such, washer accepting groove 30 is machined with a concave oval dish. Gear supporting ridge 26 also contains notches 28 machined therein. According to the preferred embodiment of the present invention, indentations are formed within notches 28 by milling gear supporting ridge 26 slightly below the surface of washer accepting groove 30. As described below, notches 28 prevent washer 40 from rotating within planetary housing 20 when in use.

Figure 5:
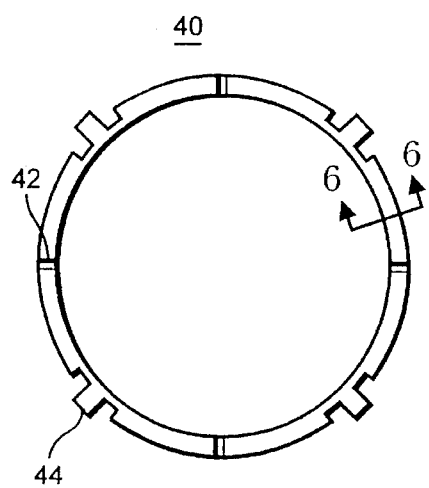
FIG. 5 shows a plan view of a washer according to the preferred embodiment of the present invention.
Figure 6:
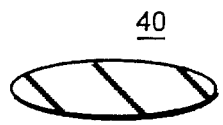
FIG. 6 shows a sectional view of the washer shown in FIG. 5, as viewed from line 6—6.

With reference now to FIG. 5, washer 40 is illustrated. According to one aspect of the present invention, washer 40 is ring-shaped and formed from a brass alloy. Alternatively, washer 40 may be formed from nylon or plastic. As shown in FIG. 2 and FIG. 6, and as described above, washer 40 preferably has a substantially oval cross section that mates with washer accepting groove 30.

Preferably, washer 40 includes a plurality of oil carrying channels 42 and a plurality of L-shaped tabs 44. Oil carrying channels 42 are integral to washer 40, and serve to provide lubricating oil to other gears and components (not shown) within the transfer case assembly. Additionally, oil carrying channels 42 provide lubricating oil to the surface of washer 40. Tabs 44 are also integral to washer 40, and serve to locate and secure washer 40 within planetary housing 20. As shown in FIG. 2, tabs 44 preferably are L-shaped extensions of washer 40.

As shown in FIG. 2 and FIG. 4, when washer 40 is installed in the sun gear/planetary housing assembly, tabs 44 extend into notches 28. Tabs 44 and corresponding notches 28 secure washer 40 and prevent it from rotating within planetary housing 20. In comparison, the prior art apparatus of FIG. 1 includes washer 12 that has no tabs or other securing elements. Consequently, washer 12 remains free to rotate against planetary housing 10, and planetary housing 10 may be worn down by the friction. Thus, the preferred embodiment of the present invention eliminates the wearing caused by a nonstationary washer.

Referring again to FIG. 2, an apparatus according to the present embodiment includes sun gear 60. Once assembled within a transfer case, planetary housing 20, washer 40, and sun gear 60 are configured substantially as illustrated. According to the preferred embodiment of the present invention, sun gear 60 includes a gear end 62 and a bearing surface 64. Gear end 62 rotates within gear cavity 24 of planetary housing 20. Bearing surface 64 is located on gear end 62, and it rotates against washer 40 when the transfer case is assembled as shown in FIG. 2. Therefore, washer 40, rather than planetary housing 20, receives the rotational friction of sun gear 60.

A method of assembling a sun gear/planetary housing assembly according to the above description may be used as either a preventative measure or a repair procedure. If an apparatus according to the preferred embodiment of the present invention is installed in a new vehicle, the stated problems associated with traditional sun gear/planetary housing assemblies are eliminated. If an existing sun gear/planetary housing assembly is already damaged, then the method of assembly may be used to repair the damage. Such a repair provides an affordable repair in lieu of replacing the entire sun gear/planetary housing assembly.

With reference again to FIG. 1, a prior art sun gear/planetary housing assembly is shown unmodified. In a preferred method of assembling a sun gear/planetary housing, planetary housing 10 is machined to provide washer accepting groove 30 as shown in FIG. 2. Washer accepting groove 30 is machined to conform to the shape of washer 40. According to one aspect of the present invention, washer accepting groove 30 has a concave oval surface that matches the profile of washer 40. Additionally, notches 28 are milled within gear supporting ridge 26, and are sized to mate with tabs 44 of washer 40. After machining, planetary housing 10 resembles planetary housing 20 depicted in FIG. 2. Next, washer 40 is installed in washer accepting groove 30, and rotated until tabs 44 align with notches 28. When washer 40 is properly aligned, it fits substantially flush with the surface of washer accepting groove 30. Finally, sun gear 60 is located within gear cavity 24 such that bearing surface 64 presses against washer 40 when the vehicle transfer case is assembled.

The above description is of a preferred embodiment of the present invention, and the invention is not limited to the specific embodiment described and illustrated. Furthermore, many variations and modifications will be evident to those skilled in this art, and such variations and modifications are intended to be included within the spirit and scope of the invention, as expressed in the following claims.

What is claimed is:

1. An apparatus for use in a vehicle transfer case assembly comprising:
    a planetary housing assembly having
        a body,
        a gear cavity formed within said body,
        a gear supporting ridge located within said gear cavity, and
        a washer accepting groove located on said gear supporting ridge;
    a washer having at least one oil carrying channel formed therein, wherein said washer mates with said washer accepting groove; and
    a sun gear assembly having
        a gear end, and
        a bearing surface located on said gear end, wherein said bearing surface bears against said washer when said vehicle transfer case is assembled.

2. An apparatus according to claim 1, further comprising a means for securing said washer such that said washer remains substantially stationary when said sun gear assembly rotates.

3. An apparatus according to claim 2, wherein said means for securing comprises a plurality of notches located on said gear supporting ridge and a plurality of tabs, located on said washer, configured to engage with said plurality of notches.

4. An apparatus according to claim 1, wherein said washer is ring-shaped.

5. An apparatus according to claim 1, wherein said washer has a substantially oval cross section.

6. An apparatus according to claim 1, wherein said washer is formed from a brass alloy.

7. An apparatus for use in a vehicle transfer case assembly comprising:
    a planetary housing assembly having
        a body,
        a gear cavity formed within said body,
        a gear supporting ridge located within said gear cavity, and
        a washer accepting groove located on said gear supporting ridge;
    a washer that mates with said washer accepting groove;

a sun gear assembly having
a gear end, and
a bearing surface located on said gear end, wherein said bearing surface bears against said washer when said vehicle transfer case is assembled; and
means for securing said washer such that said washer remains substantially stationary when said sun gear assembly rotates comprising a plurality of notches located on said gear supporting ridge, and a plurality of tabs, located on said washer, configured to engage with said plurality of notches.

8. An apparatus according to claim 7, wherein each of said plurality of notches has an indentation formed therein, and said plurality of tabs are formed into L-shaped legs that extend into said plurality of indentations.

9. An apparatus according to claim 7, wherein said washer is ring-shaped.

10. An apparatus for use in a vehicle transfer case assembly comprising:
planetary housing assembly having
a body,
a gear cavity formed within said body,.
a gear supporting ridge located within said gear cavity, and
a washer accepting groove located on said gear supporting ridge;
a washer having a substantially oval cross section that mates with said washer accepting groove;
a sun gear assembly having
a gear end, and
a bearing surface located on said gear end, wherein said bearing surface bears against said washer when said vehicle transfer case is assembled; and
a means for securing said washer such that said washer remains substantially stationary when said sun gear assembly rotates.

11. An apparatus according to claim 7, wherein said washer is formed from a brass alloy.

12. An apparatus according to claim 10, wherein said washer is ring-shaped.

13. An apparatus according to claim 10, wherein said washer is formed from a brass alloy.

14. An apparatus for use in a vehicle transfer case assembly comprising:
a planetary housing assembly having
a body,
a gear cavity formed within said body,
a gear supporting ridge located within said gear cavity,
a plurality of notches, each having an indentation formed therein, located on said gear supporting ridge, and
a washer accepting groove located on said gear supporting ridge;
a ring-shaped washer having
a plurality of oil carrying channels formed therein,
a plurality of L-shaped tabs configured to engage with said plurality of notches and extend into said plurality of indentations, wherein said washer has a substantially oval cross section and mates with said washer accepting groove; and
a sun gear assembly having
a gear end, and
a bearing surface located on said gear end, wherein said bearing surface bears against said washer when said vehicle transfer case is assembled.

15. A method of assembling a vehicle transfer case comprising the steps of:
(a) providing a planetary housing having a body, a gear cavity formed within said body, a gear supporting ridge located within said gear cavity, and a washer accepting groove formed on said gear supporting ridge;
(b) providing a washer having a plurality of tabs;
(c) providing a sun gear having a gear end and a bearing surface located on said gear end;
(d) forming a plurality of notches within said gear supporting ridge, wherein said plurality of notches are sized to mate with said plurality of tabs;
(e) placing said washer into said washer accepting groove;
(f) after step (e), aligning said plurality of tabs with said plurality of notches; and
(g) after step (f), locating said sun gear within said gear cavity such that said bearing surface bears against said washer when said vehicle transfer case is assembled.

16. A method of assembling a vehicle transfer case according to claim 15, wherein said planetary housing in step (a) has a body, a gear cavity formed within said body, and a gear supporting ridge located within said gear cavity, and further comprising the step of forming a washer accepting groove on said gear supporting ridge before step (e).

* * * * *